United States Patent
Okubo et al.

(10) Patent No.: US 6,776,450 B2
(45) Date of Patent: Aug. 17, 2004

(54) ATTACHMENT STRUCTURE OF SLIDE RAIL COVER TO VEHICLE BODY

(75) Inventors: Hiroshi Okubo, Wako (JP); Hiroshi Tokuyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/228,536

(22) Filed: Aug. 26, 2002

(65) Prior Publication Data

US 2003/0071484 A1 Apr. 17, 2003

(30) Foreign Application Priority Data

Oct. 12, 2001 (JP) ........................................ 2001-316052

(51) Int. Cl.[7] .................................................. B60J 5/06
(52) U.S. Cl. ...................... 296/146.9; 296/155
(58) Field of Search .......................... 296/155, 203.03, 296/203.04, 29, 147, 148, 146.9, 193.05, 193.08, 195, 149; 49/360, 221; 16/87.4 R, 94 R, 96 R, 95 R

(56) References Cited

U.S. PATENT DOCUMENTS

| | | | | |
|---|---|---|---|---|
| 4,973,102 A | * | 11/1990 | Bien | 296/187.01 |
| 5,061,108 A | * | 10/1991 | Bien et al. | 403/24 |
| 5,322,339 A | * | 6/1994 | Dubernard | 296/155 |
| 5,454,618 A | * | 10/1995 | Sullivan | 296/155 |
| 5,558,369 A | * | 9/1996 | Cornea et al. | 280/800 |
| 5,676,417 A | * | 10/1997 | Olivier | 296/155 |
| 6,152,519 A | * | 11/2000 | Blank et al. | 296/155 |
| 6,244,652 B1 | * | 6/2001 | Shoudou et al. | 296/155 |
| 6,390,536 B2 | * | 5/2002 | Tsubokura et al. | 296/155 |
| 6,550,848 B2 | * | 4/2003 | Kleemann | 296/155 |
| 6,722,730 B2 | * | 4/2004 | Lydan et al. | 296/191 |

FOREIGN PATENT DOCUMENTS

| | | | | |
|---|---|---|---|---|
| EP | 000357541 | * | 3/1990 | 296/155 |
| JP | 356039921 | * | 4/1981 | 296/155 |
| JP | 63-17113 | * | 3/1988 | 296/155 |
| JP | 2-63919 | * | 3/1990 | 296/155 |
| JP | 2-63920 | * | 3/1990 | 296/155 |
| JP | 2-63921 | * | 3/1990 | 296/155 |
| JP | 10-67341 | | 3/1998 | |

* cited by examiner

*Primary Examiner*—D. Glenn Dayoan
*Assistant Examiner*—H. Gutman
(74) *Attorney, Agent, or Firm*—Merchant & Gould P.C.

(57) ABSTRACT

An attachment structure of a slide rail cover for covering a slide rail fixed to a side of a vehicle body from the outside to the vehicle body, has a main body cover including a slide rail attachment portion and a vehicle body attachment portion, the slide rail attachment portion being adapted to support the main body cover with rigidity, and the vehicle body attachment portion being adapted to regulate the position of the main body cover in vertical and lateral directions. The position of at least one of the vehicle body attachment portion and the slide rail attachment portion is regulated in a forward or rearward direction of the main body cover.

4 Claims, 7 Drawing Sheets

PRIOR ART

US 6,776,450 B2

ATTACHMENT STRUCTURE OF SLIDE RAIL COVER TO VEHICLE BODY

BACKGROUND OF THE INVENTION

1. Field of the Invention

The present invention relates to an attachment structure of a slide rail cover to a vehicle body, and more particularly to an attachment structure of a slide rail cover to a vehicle body which can improve the fitting precision and facilitate the assembly of the slide rail cover to the vehicle body.

2. Description of the Related Art

For example, as shown in FIG. 9, there exists a case where an attachment portion 2 provided at an upper portion of a fender panel 1 is fixed to a front pillar 3 with a screw 4 and an attachment portion 5 provided at a lower portion of the fender panel 1 is fixed to a side sill 6 with a bolt 7 (refer to JP-A-10-67341).

Thus, in a case where a vehicle body part such as the fender panel 1 is fixed directly to locations of the vehicle body such as the front pillar 3 and the side sill 6 which are positioned with a certain precision, a required fitting precision can be attained after the attachment of the fender panel 1 to those locations.

Incidentally, in a vehicle having a slide door, there exists a case where a slide rail cover is fixed to cover an opening in a slide rail fixed to a side of a vehicle body. When attempting to attach the slide rail cover to the vehicle body via the slide rail in order to secure a sliding space for a slide arm, an attachment error of the slide rail to the vehicle body and an attachment error of the slide rail cover to the slide rail are added, and as a result, serve to enhance a fitting error between the vehicle body and the slide rail cover, whereby the external appearance quality is damaged.

To cope with the problem, the attachment precision of the slide rail to the vehicle body and the attachment precision of the slide rail cover to the slide rail need to be set strictly, and this increases the number of man hours in management of the production of vehicles. Thus, there is caused a problem that the strict management of attachment of the slide rail cover to the slide rail increases the production costs in the end.

SUMMARY OF THE INVENTION

To cope with the problem, an object of the invention is to provide an attachment structure of a slide rail cover to a vehicle body which can facilitate the production and assembly of respective components such as vehicle body, slide rail, slide rail cover while maintaining the fitting precision.

With a view to attaining the object, according to an aspect of the invention, there is provided an attachment structure of a slide rail cover (for example, a slide rail cover 15 in an embodiment) for covering a slide rail (for example, a slide rail 14 in the embodiment) attached to a side of a vehicle body from the outside of the vehicle body, wherein a slide rail attachment portion (for example, a slide rail attachment hole 38 in the embodiment) and a vehicle body attachment portion (for example, an attachment hole 44 and a through hole 63 in the embodiment) are provided on a main body cover (for example, a main body cover 35 in the embodiment), the slide rail attachment portion being adapted to support the main body cover with rigidity, and the vehicle body attachment portion being adapted to fix the position of the main body cover in vertical and horizontal directions, and in that the position of at least one of the vehicle body attachment portion and the slide rail attachment portion is fixed in a forward or rearward direction of the main body cover.

Thus, according to the construction, since the main body cover only has to be supported with rigidity by the slide rail attachment portion of the main body cover so that the main body cover does not move loosely when touched, there is no need to strictly set the attachment precision of the slide rail to the vehicle body. In addition, the vehicle body attachment portion the main body cover is fixed directly to the vehicle body which provides the fitting precision to thereby facilitate the fixing of the position of the main body cover in vertical and horizontal directions.

DETAILED DESCRIPTION OF THE PREFERRED EMBODIMENTS

Figure 1:
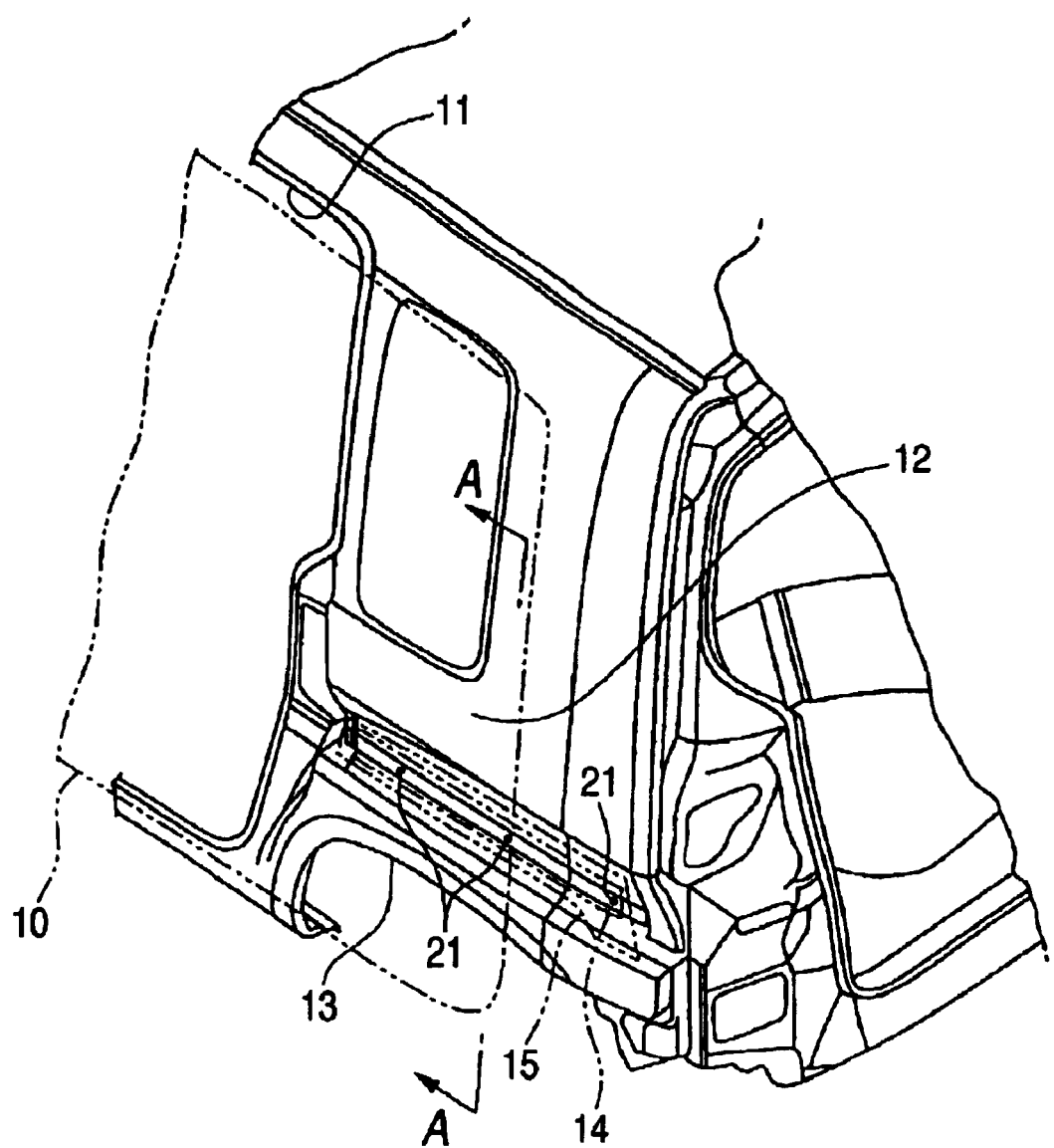
FIG. 1 is a partial perspective view of a rear part of a vehicle body according to an embodiment of the invention.
Figure 2:
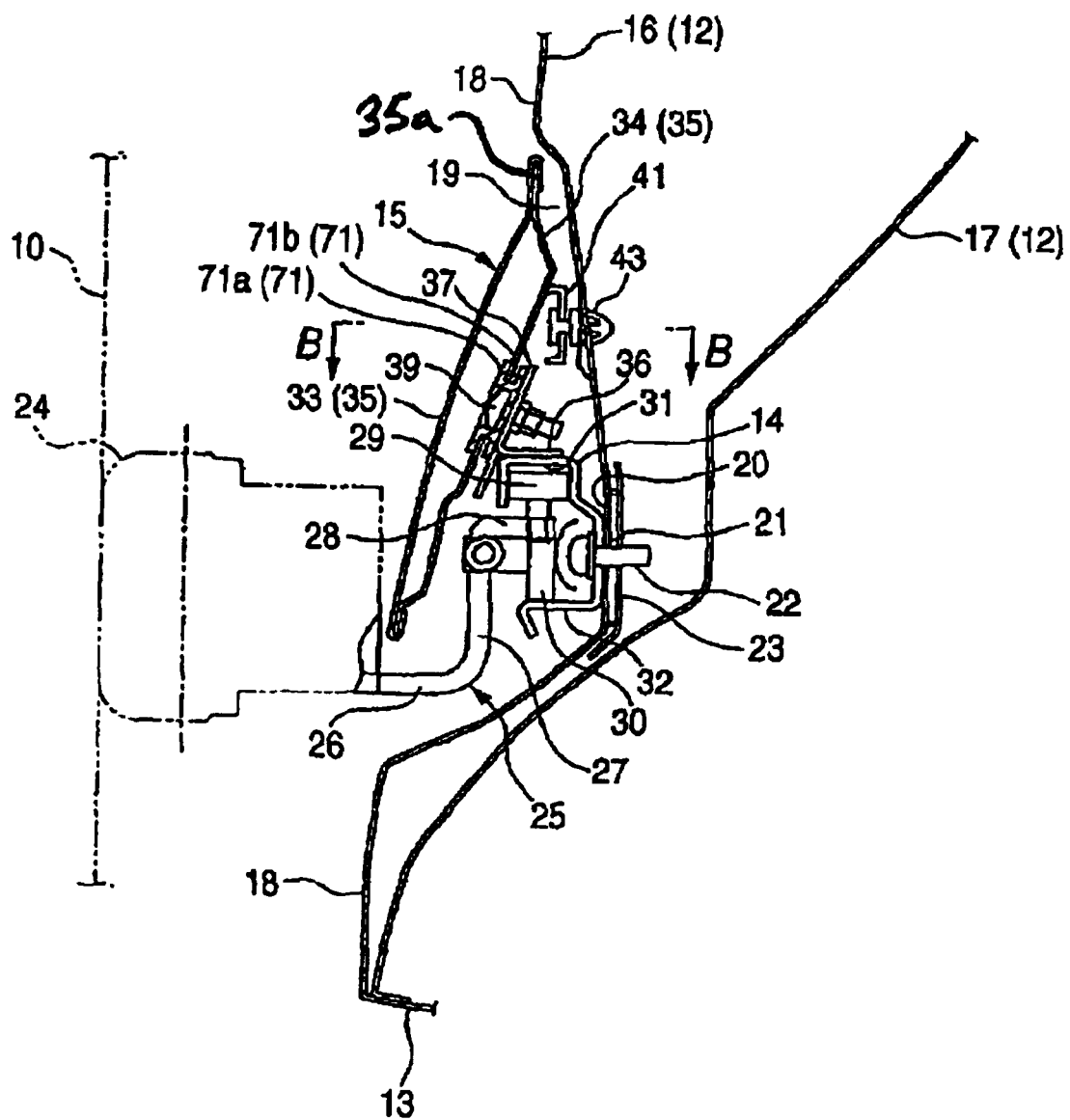
FIG. 2 is a sectional view taken along the line A—A in FIG. 1.

An embodiment of the invention will be described below in conjunction with the accompanying drawings. FIG. 1 is a partial perspective view of a rear part of a vehicle body, and FIG. 2 is a sectional view taken along the line A—A in FIG. 1. In FIG. 1, a slide door 10 is provided at a portion on a left-hand side of the vehicle body in such a manner as to be opened and closed, and a slide door opening 11 in the portion on the left-hand side of the vehicle is designed to be closed and opened by the slide door 10. A slide rail 14 is attached to a rear fender panel 12 provided rearward of the slide door opening 11 in such a manner as to extend in a longitudinal direction above a rear wheel arch portion 13, and this slide rail 14 is designed to be covered by a slide rail cover 15.

To be specific, as shown in FIG. 2, the rear fender panel 12 is constituted by an outer panel 16 and an inner panel 17. A slide rail receiving portion 19 is provided to extend in a longitudinal direction above the rear wheel arch portion 13 by recessing a general surface 18 of the outer panel 16 in a direction toward the interior of a passenger compartment, and an attachment plane 20 is formed at a bottom portion of the slide rail receiving portion 19 along the longitudinal direction. Then, attachment holes 21 for the slide rail 14 are formed in the attachment plane 20 at three locations (shown in FIGS. 1 and 6), and the slide rail 14 is fixed at the attachment holes 21 with bolts 22. In addition, a backing member 23 serving as a nut member is provided on a back side of the outer panel 16.

An arm 25 is provided on the slide door 10 via an attachment bracket 24. This arm 25 is a member having a crank-like cross section which includes a horizontal portion 26 which extends from the attachment bracket 24, a vertical portion 27 which extends upwardly from an end portion of the horizontal portion 26 and a roller installing portion 28 which extends horizontally further from the vertical portion 27, and a horizontal roller 29 is rollingly installed at an upper portion of the roller installing portion 28, while a vertical roller 30 is rollingly installed at a lower portion of the roller installing portion 28. In addition, the arm 25 is rotatably supported on a vertical shaft relative to the attachment bracket 24, and the slide rail 14 is intruded into the passenger compartment on the slide door opening 11 side, whereby the slide door 10 can fit in the slide door opening 11 when it is closed.

The slide rail 14 is provided with a guide portion 31 for the horizontal roller 29 at an upper portion and a guide portion 32 for the vertical roller 30 at a lower portion thereof and is constructed such as to guide the horizontal roller 29 and the vertical roller 30 to thereby allow the movement of the slide door 10 in the longitudinal directions. Then, the slide rail cover 15 is fixed to an upper wall of the guide portion 31 for covering the slide rail 14 so that the slide rail 14 cannot be seen from the outside.

The slide rail cover 15 has a main body cover 35 which is constructed by seaming together an outer cover 33 and an inner cover 34. Then, a bracket 36 for fixing the main body cover 35 is fixed to the upper wall of the slide rail 14. The bracket 36 is provided with an attachment plane 37 for supporting the inner cover 34 of the main body cover 35, and the inner cover 34 of the main body cover 35 is designed to be brought into press abutment with the attachment plane 37 via a fixing block 71 which is fixed to a bolt 37.

Here, an elongate hole portion 40 which extends to the rear is formed in a slide rail attachment hole (shown in FIG. 6) 38, whereby the slide rail attachment hole 38 is formed into a key hole configuration. When a head portion 71a of the fixing block 71 is caused to slide to the rear with the head portion 71a of the fixing block 71 being passed through the slide rail attachment hole 38, a groove portion 71b of the head portion 71a is allowed to move along the elongate hole portion 40. In addition, the elongate hole portion 40 is formed with certain margins in the vertical and horizontal directions relative to the groove portion 71b.

Consequently, the main body cover 35 is fixed in a state in which the position of the main body cover 35 is substantially fixed relative to the slide rail 14 in the horizontal direction by the attachment plane 37 of the bracket 36, and the slide rail attachment hole 38 can allow the longitudinal movement of the main body cover 35 relative to the head portion 71 a of the fixing block 71 by the elongate hole portion 40, whereby the main body cover 35 can be supported with rigidity to the slide rail attachment holes 38 such that the main body cover 35 does not move loosely when touched.

Figure 3:
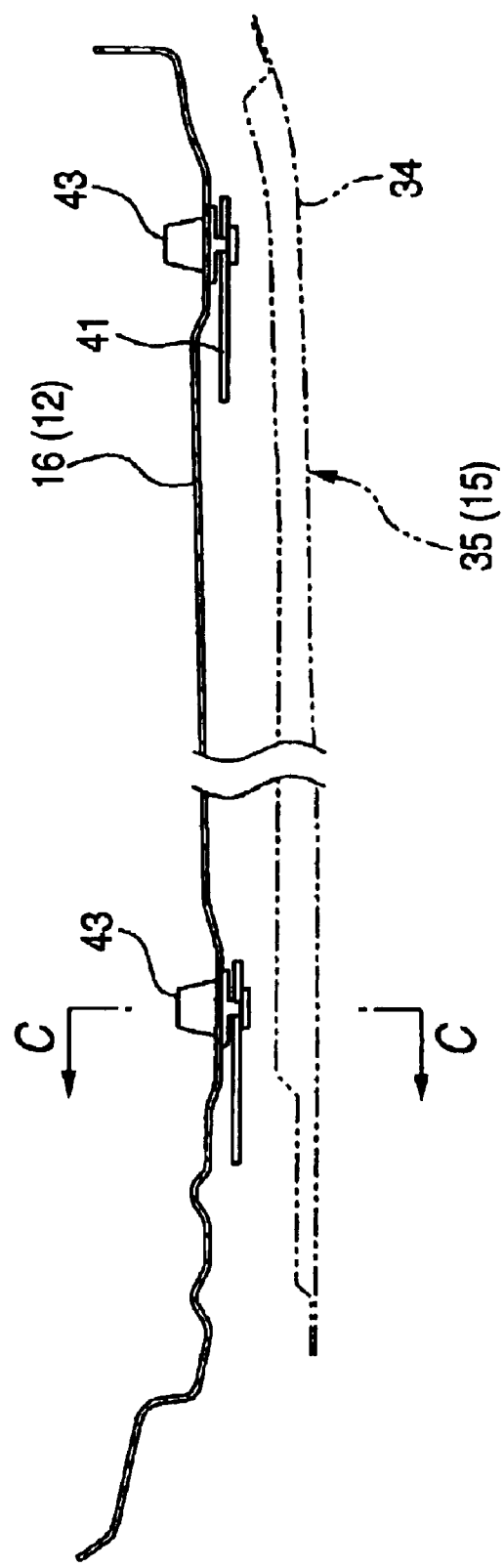
FIG. 3 is a sectional view taken along the line B—B in FIG. 2.
Figure 4:
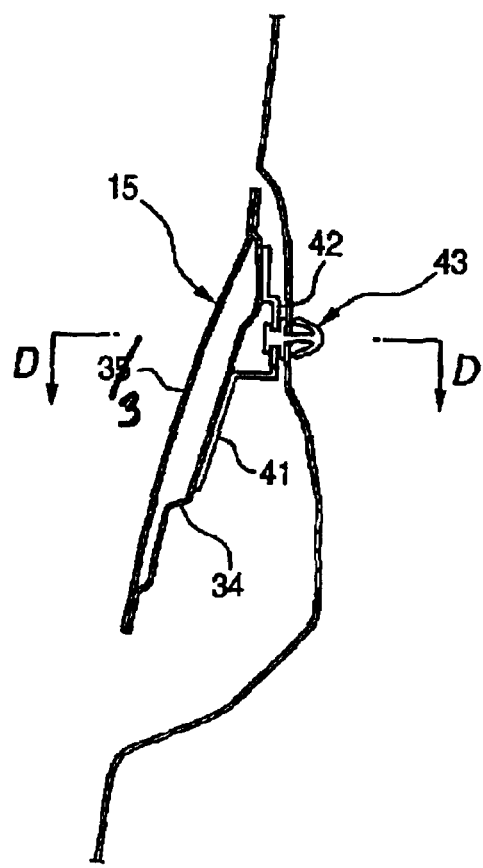
FIG. 4 is a sectional view taken along the line C—C in FIG. 3.
Figure 5:
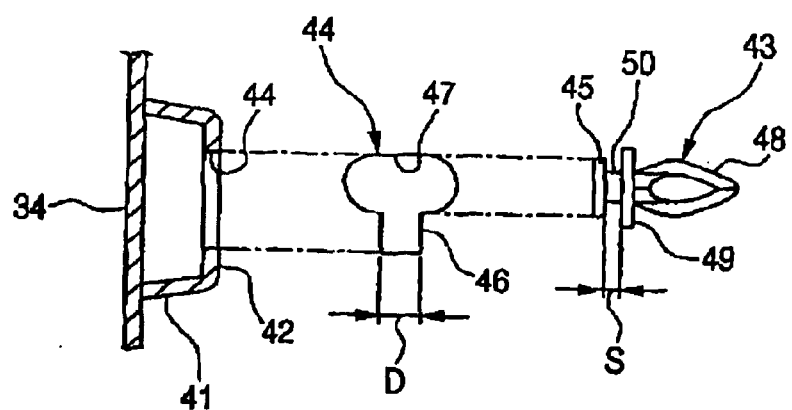
FIG. 5 is a sectional view taken along the line D—D in FIG. 4.

As shown in FIGS. 3 to 5, the slide rail cover 15 is attached to the outer panel 16 of the rear fender panel 12. FIG. 3 is a sectional view taken along the line B—B in FIG. 2, FIG. 4 is a sectional view taken along the line C—C in FIG. 3, and FIG. 5 is an explanatory view comprising an enlarged sectional view of a reinforcing member taken along the line D—D in FIG. 4. and views of an attachment hole and a clip which will be described later.

The reinforcing member 41 is attached to the inner cover 34 of the slide rail cover 15. As also shown in FIG. 5, a flat attachment seat 42 is formed on the reinforcing member 41 and an attachment hole 44 for a clip 43 is formed in the attachment seat 42. Formed continuously in the attachment hole 44 are an elongate hole portion 46 adapted to lock on the head portion 45 of the clip 43 and a pass-through portion 47 for receiving the head portion 45 of the clip 43, whereby the attachment hole 44 is formed into a key hole configuration. The longitudinal movement of the slide rail cover 15 relative to the rear fender panel 12 is permitted by this elongate hole portion 46.

A flange portion 49 between the head portion 45 of the clip 43 and a locking portion 48 of the clip 43 is set such that a distance S between the flange portion 49 and the head portion 45 aligns with the thickness of the reinforcing member 41, and the diameter of a shaft portion 50 of the clip 43 is designed to align with the width D of the elongate hole portion 46 and fix the main body cover in the lateral direction.

Consequently, the main body cover 35 is fixed in a state in which the position of the main body cover 35 is easily fixed in the horizontal direction to the outer panel 16 of the rear fender panel 12 when the attachment seat 42 is brought into abutment with the flange portion 49 of the clip 43, and in a state in which the position of the main body cover 35 is easily fixed relative to the outer panel 16 of the rear fender 12 in the vertical directions when the shaft portion 50 of the clip 43 is received in the elongate hole portion 46 in the attachment hole 44 of the clip 43.

Figure 6:
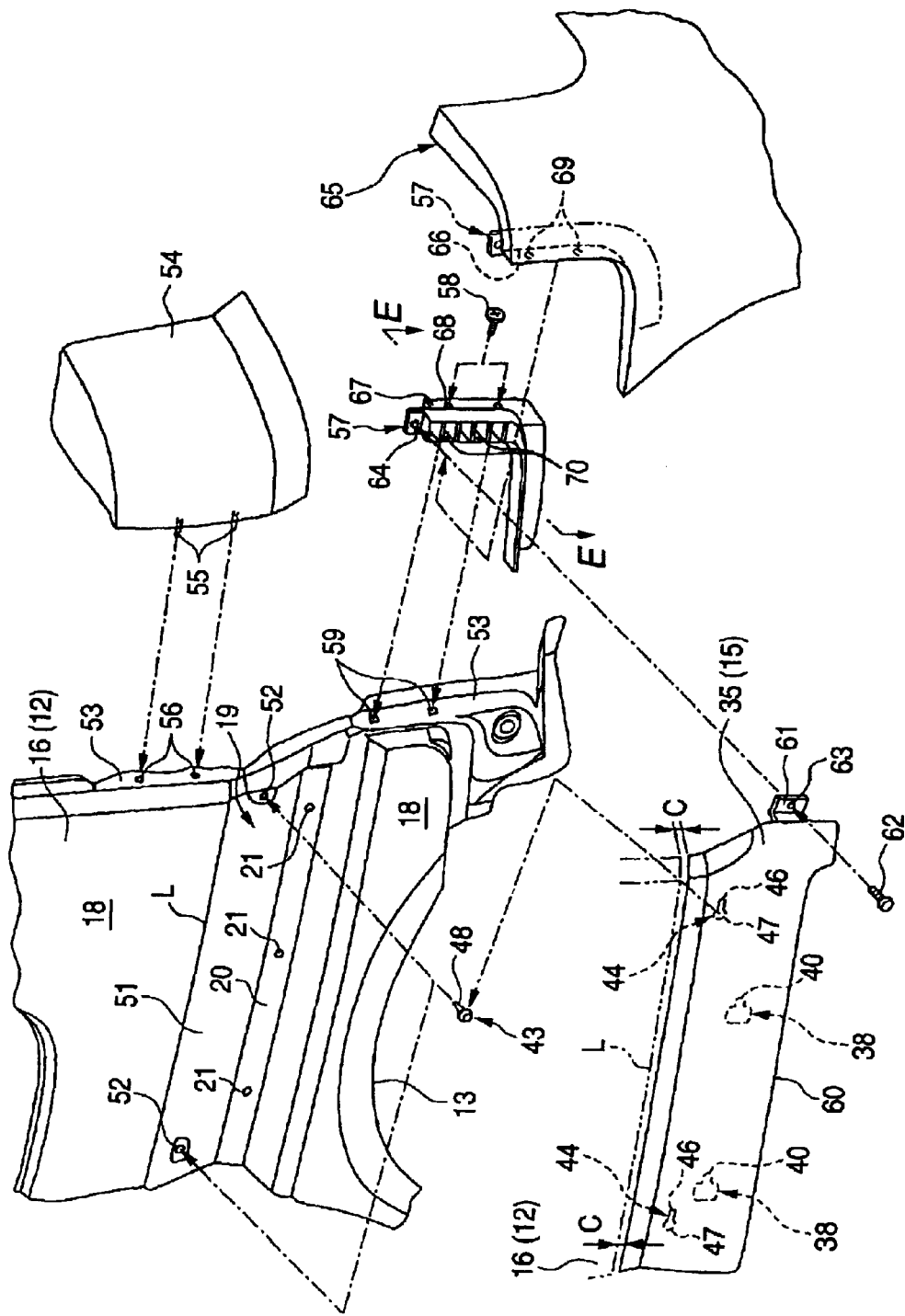
FIG. 6 is an exploded perspective view of a portion of the vehicle body which is in the vicinity of a slide rail cover.
Figure 7:
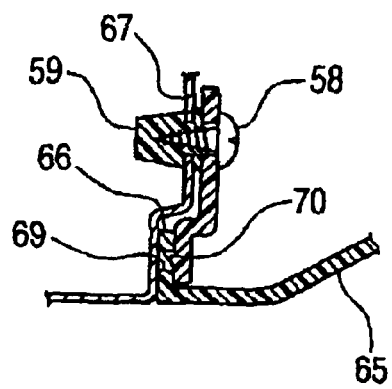
FIG. 7 is a sectional view taken along the line E—E in FIG. 6.

Next, referring to FIGS. 6 and 7, the slide rail cover 15 and peripheral members around the periphery of the rear fender panel 12 to which the slide rail cover 15 is fixed will be described. FIG. 6 is an exploded perspective view of a portion around the slide rail cover of the vehicle body, and FIG. 7 is a sectional view taken along the line E—E in FIG. 6.

In the figures, as has been described before, the slide rail receiving portion 19 is formed in the outer panel 16 of the rear fender panel 12, and the attachment holes 21 for the side rail 14 are formed in the attachment plane 20 of the bottom portion of the slide rail receiving portion 19 at the three positions.

In addition, inclined planes which incline outwardly from the attachment plane 20 are provided above and below the attachment plane 20 in the slide rail receiving portion 19, and locking holes 52 in which the locking portion 48 of the clip 43 is locked are formed in the upper inclined plane 51 at two positions thereof in such a manner as to be oriented in the lateral direction. A flange 53 facing to the rear is formed along a rear edge of the outer panel 16. Attachment holes 56 for machine screws 55 for a rear combination lamp 54 are formed in an upper portion of the flange 53 at two positions, and attachment members 59 into which machine screws 58 for a bumper spacer 57 are screwed are attached to a lower portion of the flange 53 at two positions.

The main body cover 35 of the slide rail cover 15 is designed to form a gap C of a certain space along the longitudinal direction between an upper edge of the main body cover 35 and a ridge L between the inclined plane 51 and the general plane 18 when the main body cover 35 is attached to the outer panel 16 of the rear fender panel 12. In addition, a lower edge of the main body cover 35 is cut out from a front end to a position just before a rear end thereof as a relief 60 to permit the longitudinal movement of the arm 25 of the slide door 10.

An attachment piece 61 to the bumper spacer 57 is provided at a rear edge of the main body cover 35, which attachment piece 61 is oriented in the lateral direction, and a through hole 63 for a bolt 62 is formed in the attachment piece 61. The main body cover 35 of the slide rail cover 15 can be attached to the rear fender panel 12 in a condition Where the position of the main body cover 35 can be fixed in the longitudinal directions by passing the bolt 62 through the through hole 63 to be fixed in an attachment hole 64 in the bumper spacer 57.

The slide rail attachment holes 38 are formed at two positions in the inner cover 34 which constitutes a back side of the main body cover 35, and the attachment holes 44 for the clips 43 are also formed in the inner cover 34 at two positions which are situated above the slide rail attachment holes 38. Here, both the elongate hole portions 40 of the slide rail attachment holes 38 and the elongate hole portions 46 of the attachment holes 44 for the clips 43 are formed to extend to the rear.

The bumper spacer 57 is a member made of resin and having a substantially L-shaped configuration and is formed in such a manner as to surround a lower corner portion of the outer panel 16 of the rear fender panel 12 from the outside. Formed in an upper portion of a side of the bumper spacer 57 is the attachment hole 64 for the bolt 62 which corresponds to the through hole 63 in the attachment piece 61 on the slide rail cover 15, and formed at a front part of the bumper spacer 57 is an attachment wall 67 which is brought into abutment with a front flange 66 of a rear bumper 65 from the front and which extends in the lateral direction. As shown in FIG. 7, through holes 68 for machine screws 58 are formed in the attachment wall 67 in such a manner as to align with the attachment members 59 provided on the flange portion 53 of the outer panel 16 of the rear fender panel 12, and pawls 70 are also provided on the attachment wall 67 which are adapted to lock in engagement holes 69 in the front flange 66 of the rear bumper 65.

Next, with reference to FIG. 6, installing procedures for the respective members will be described.

The bumper spacer 57 is fixed to the outer panel 16 of the rear fender panel 12 with the machine screws 58, 58. Next, the locking portions 48 of the clips 43, 43 are left locked in the locking holes 52, 52 in the outer panel 16 of the rear fender 12. Then, the main body cover 35 is pressed against the outer panel 16 of the rear fender panel 12 by aligning the pass-through portions 47, 47 of the attachment holes 44, 44 in the main body cover 35 with the head portions 45 of the clips 43, 43 and aligning the attachment holes 38, 38 in the main body cover 35 with the head portion 71a of the fixing block 71 on the slide rail 14 side. In this state, a difference in level between the general plane 18 of the outer panel 16 of the rear fender panel 12 and an upper flat portion 35a of the main body cover 35 can be eliminated.

Then, when the main body cover 35 is moved forward, the shaft portion 50 of the clip 43 is guided along the elongate hole portion 46 in the attachment hole 44, and the groove portion 71b of the head portion 71a of the fixing block 71 is guided by the elongate hole portion 40 in the slide rail attachment hole 38.

Furthermore the bolt 62 is passed through the through hole 63 in the attachment piece 61 of the main body cover 35 so as to be fixed in the attachment hole 64 in the bumper spacer 57, whereby the main body cover 35 of the slide rail cover 15 is fixed to the rear fender panel 12 with the position of the main body cover 35 being fixed in the rearward direction. This allows the gap C of a certain space to be formed along the longitudinal direction between the upper edge of the main body cover 35 and the ridge L.

Then, the front flange 66 of the rear bumper 65 is pushed in between the bumper spacer 57 and the outer panel 16 of the rear fender panel 12 so that the engagement holes 69 in the rear bumper 65 are locked by the pawls 70 on the bumper spacer 57, whereby the rear bumper 65 is attached to the bumper spacer 57.

Finally, the rear combination lamp 54 is fastened with the machine screws 55 in the attachment holes 56 of the flange portion 53, so that the rear combination lamp 54 is fixed to the outer panel 16 of the rear fender panel 12.

Figure 8:
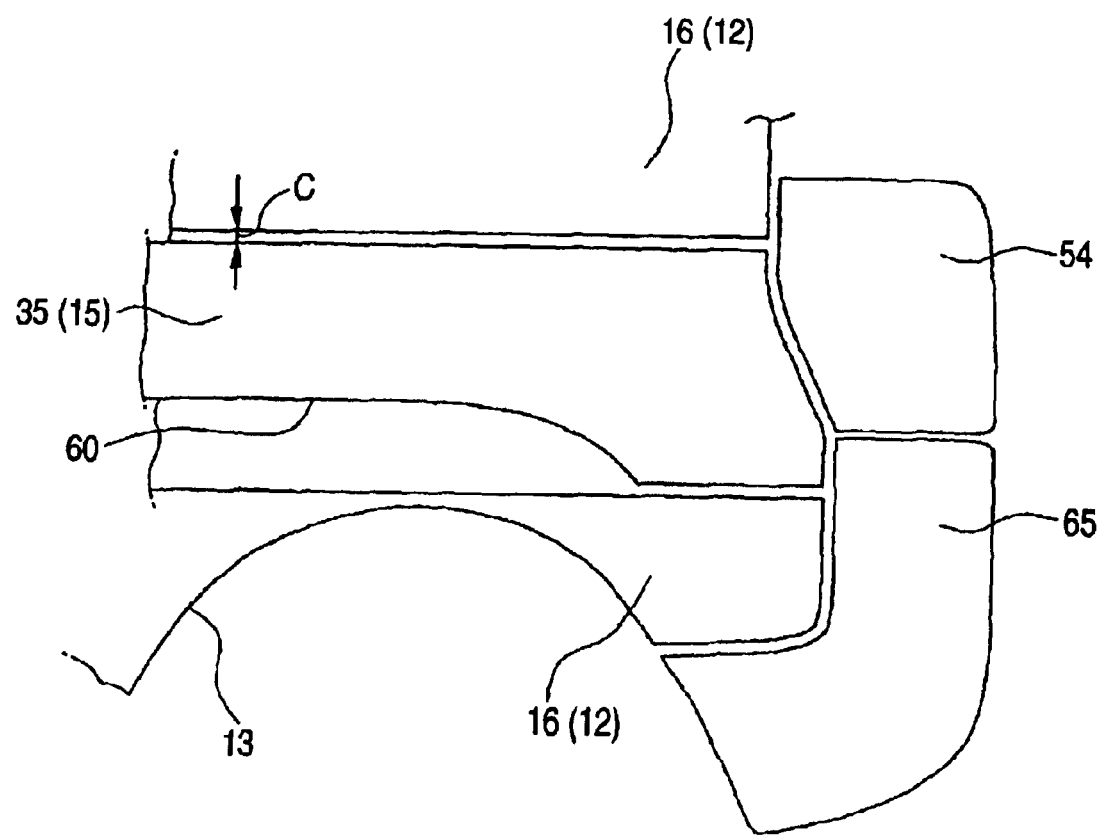
FIG. 8 is a side view of the rear part of the vehicle body according to the embodiment of the invention.
Figure 9:
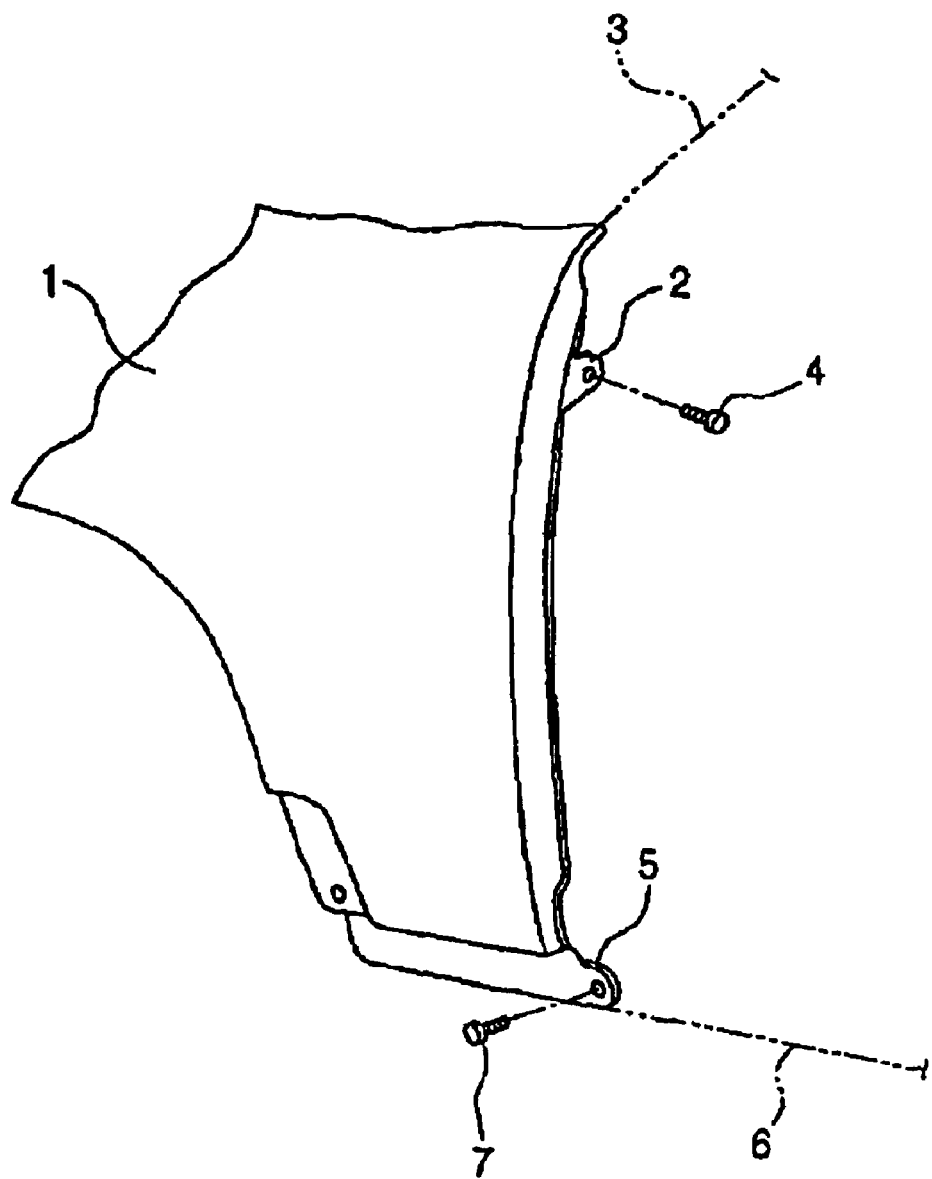
FIG. 9 is a perspective view of a related art.

Consequently, as shown in FIG. 8, the gap C between the outer panel 16 of the rear fender 12 and the main body cover 35 is secured to maintain the certain space, whereby the outer edge of the rear combination lamp 54 and the outer edge of the inverted L-shaped configuration of the rear bumper 65 can maintain the certain gap relative to the outer panel 16 to secure a required fitting precision, whereby the external appearance quality can be improved.

According to the embodiment, since the slide rail attachment holes 38 in the main body cover 35 only have to maintain the rigidity, the attachment precision of the slide rail 14 to the outer panel 16 of the rear fender panel 12 does not have to be strict, and only the rigidity is set such that the slide rail 14 and the outer panel 16 are dislocated from each other.

Consequently, since the mounting precision does not have to be strict to the vertical and horizontal directions, the production and assembly of the respective components such as the rear fender panel 12, the slide rail 14 and the main body cover 35 can be facilitated.

In addition, since the main body cover 35 can be fixed to the rear fender panel 12 which required fitting precision in the state in which the position of the main body cover 35 is fixed in the vertical directions by positioning the elongate hole portions 46 in the attachment holes 44 at the shaft portions 50 of the clips 43, as well as in the horizontal directions by allowing the reinforce into member 41 to abut with the flange portions 49 of the clips 43, the fixation of the main body cover 35 to the rear fender panel 12 of the vehicle body is facilitated with good precision.

Consequently, in a case where the slide rail cover 15 is fixed to the vehicle body via the slide rail 14 which is a separate component, as has been described above, the production can be simplified, the attachment efficiency can be improved and a sufficient fitting precision relative to the vehicle body can be secured.

In addition, the invention is not limited to the embodiment that has been described heretofore. For example, while the invention has been described as the position of the main body cover 35 being fixed in the longitudinal direction by fixing the through hole 63 which is the vehicle body attachment portion, the slide rail attachment holes 38, which are the slide rail attachment portion, may function to fix the position of the main body cover 35 in the vertical and horizontal directions of the vehicle body. In addition, the main body cover may be directly fixed to the vehicle body without the bumper spacer 57 being interposed there between.

Thus, as has been described heretofore, according to the aspect of the invention, since the slide rail attachment portion of the main body cover only has to function to provide the required rigidity, the attachment precision of the slide rail to the vehicle body does not have to be set strictly, and therefore, there is provided an advantage that the production and assembly, and attachment of the respective components such as the slide rail and the cover can be facilitated by an extent such that the attachment precision does not have to be managed strictly.

In addition, since the main body cover can be directly fixed to the vehicle body which requires the certain fitting precision with the position thereof being fixed in the vertical and horizontal directions, the attachment of the main body cover to the vehicle body with good precision can be facilitated.

Consequently, in a case where the slide rail cover 15 is attached to the vehicle body via the slide rail 14 which is a separate component, as has been described above, the production can be simplified, the attachment efficiency can be improved and a sufficient fitting precision relative to the vehicle body can be secured.

Furthermore, since the main body cover is held by the slide rail attachment portion with rigidity and the fitting precision is attained by the vehicle attachment portion, there is provided an advantage that the vehicle attachment portion can be made smaller in size by an extent such that the portion does not have to be provided with the holding function.

What is claimed is:

1. An attachment structure of a slide rail cover for covering a slide rail fixed to a side of a vehicle body from outside the vehicle body, said slide rail including an attachment surface, comprising:

a main body cover including a fixing block supported by the attachment surface of the slide rail to allow the main body cover to move in the longitudinal direction; and a clip fixed to one of the main body cover and the vehicle body and engageable with an attachment hole formed in the other of the main body cover and the vehicle body so as to allow the position of the main body cover to be regulated in the vertical and lateral direction.

2. A vehicle with a slide door, comprising:

a slide rail attached to a side of a vehicle body so that the slide door is slidable with respect to the vehicle body;

a slide rail cover covering the slide rail from outside the vehicle body;

means for supporting the slide rail cover with rigidity relative to the slide rail; and means for attaching the slide rail cover to the vehicle body, said attaching means including means for allowing regulation of the position of the slide rail cover in vertical and lateral directions relative to the vehicle body;

wherein at least one of the supporting means and the attaching means allows for regulation of the position of the slide rail cover in a longitudinal direction.

3. The vehicle according to claim 2, wherein said supporting means includes said slide rail having an attachment surface supporting a surface of the slide rail cover.

4. The vehicle according to claim 2, wherein said attaching means includes a clip fixed to one of the slide rail cover and the vehicle body and engageable with an attachment hole formed in the other of the slide rail cover and the vehicle body so as to allow the position of the slide rail cover to be regulated in the vertical and lateral direction.

* * * * *